United States Patent [19]
Goto et al.

[11] Patent Number: 5,876,656
[45] Date of Patent: Mar. 2, 1999

[54] METHOD OF FABRICATING A MOLDING

[75] Inventors: Shinichi Goto, Gifu; Masao Kobayashi, Aichi; Hiroshi Iwasaki, Aichi; Sadao Nada, Aichi, all of Japan

[73] Assignee: Toyota Gosei Co., Ltd., Aichi, Japan

[21] Appl. No.: 623,828

[22] Filed: Mar. 29, 1996

[30] Foreign Application Priority Data

Mar. 31, 1995 [JP] Japan .................................. 7-075157

[51] Int. Cl.⁶ .................................................. B29C 35/12
[52] U.S. Cl. .................... 264/450; 264/452; 264/486; 264/491; 264/151; 264/163; 264/296; 264/DIG. 46; 425/174.8 R
[58] Field of Search .................................... 264/450, 451, 264/449, 452, 486, 487, 491, DIG. 46, 151, 163, 153, 161, 296; 425/174.8 R

[56] References Cited

U.S. PATENT DOCUMENTS

| | | | |
|---|---|---|---|
| 4,459,249 | 7/1984 | Matsuda | 264/451 |
| 4,489,019 | 12/1984 | Takeda et al. | 264/248 |
| 4,937,021 | 6/1990 | Danforth et al. | 264/153 |
| 4,940,557 | 7/1990 | Kimura | 264/151 |
| 5,082,436 | 1/1992 | Choi et al. | 425/174.8 R |
| 5,139,407 | 8/1992 | Kim et al. | 264/451 |
| 5,338,497 | 8/1994 | Murray et al. | 264/486 |

FOREIGN PATENT DOCUMENTS

| | | | |
|---|---|---|---|
| 55-90319 | 8/1980 | Japan . | |
| 56-129116 | 10/1981 | Japan | 264/449 |
| 61-106214 | 5/1986 | Japan | 264/451 |
| 61-106215 | 5/1986 | Japan | 264/451 |
| 63-41237 | 2/1988 | Japan | 264/487 |
| 3-87216 | 4/1991 | Japan | 264/486 |

*Primary Examiner*—Jeffery R. Thurlow
*Attorney, Agent, or Firm*—Cushman Darby & Cushman IP Group of Pillsbury Madison & Sutro

[57] ABSTRACT

With an auxiliary electrode having a shape corresponding to the end of a workpiece attached to an upper electrode of a high frequency heater for high-frequency heating the end of the workpiece extruded, the workpiece is high-frequency heated intensively and uniformly between the auxiliary electrode and the lower electrode. After heating, the end of the workpiece is molded into a predetermined shape by a couple of stamping molds.

11 Claims, 5 Drawing Sheets

FIG. 8 (a) PRIOR ART
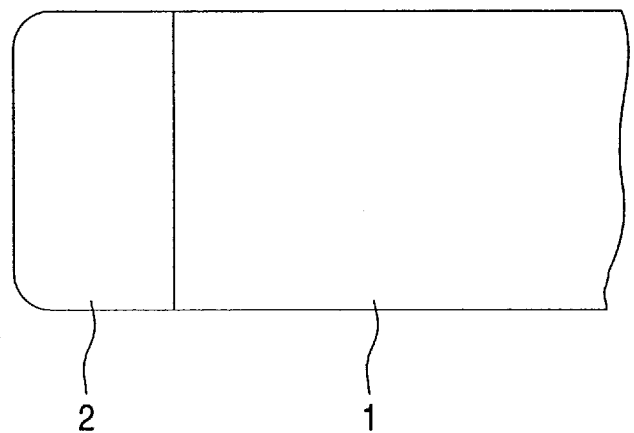
FIG. 8 (b) PRIOR ART
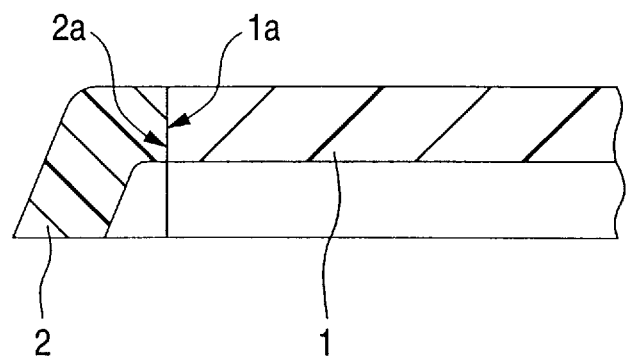

METHOD OF FABRICATING A MOLDING

The priority document, Japanese Patent Application No. Hei 7-75157, filed in Japan on Mar. 31, 1995, is hereby incorporated into the present specification by this reference.

BACKGROUND OF THE INVENTION

1. Field of the Invention

The present invention relates to a method of fabricating a molding, and more particularly to a method of fabricating a molding which high-frequency heats the longitudinal end of a workpiece extruded by extrusion and thereafter molds the workpiece into a molding having a prescribed shape.

2. Description of Related Art

A method of fabricating a molding such as a side molding for a motor vehicle is previously known wherein resin material is extruded into a predetermined sectional shape by an extrusion machine, the material is cooled and cut into segments each having a predetermined length and, both longitudinal ends of each segment is set in a metallic mold of an injection molding machine and both ends are integrally molded to have predetermined shapes. The molding fabricated by this method is shown in FIGS. 8(a) and (b).

FIGS. 8(a) and (b) show the end of a molding fabricated by the conventional molding fabrication method; FIG. 8(a) is a partial plan view thereof and FIG. 8(b) is a partial sectional view.

In these drawings, generally, a molding body 1 is successively extruded by extrusion, and its plane shown in FIG. 8(a) cut in a predetermined length constitutes a design plane. An end 2 is formed on the tip of the molding body 1 by injection molding, and one or both ends of the molding body 1 successively extruded by extrusion are finished in a predetermined design.

The above conventional molding fabricating method provides a difference in shape between the extrusion orifice of an extrusion machine and the cavity of an injection molding metallic mold whose shapes define the sectional shapes of the molding body 1 and the end 2, and a variation in material or size between the molding body 1 and the end 2. Such difference or variation results in a connection line, burrs or level difference between the molding body 1 and the end 2 so that in some cases, a beautiful design plane cannot be obtained therebetween.

Such poor appearance in the design plane between the molding body 1 and the end 2 is remarkable in surface treatment increasing a sink on the side of the junction surface 2a of the end 2, in which both are colored, a shining film is bonded, etc.

To solve the aforementioned problem, a molding fabricating method has been proposed in which the end of a long workpiece extruded by an extrusion machine is previously softened by heating and the end of the workpiece in the softened state, is molded into a desired shape.

In this case, the end of the workpiece is heated by a high frequency heating machine including upper and lower electrodes. However, the upper and lower electrodes are formed in a relatively large scale so as to permit moldings having various kinds of specifications. For this reason, when the end of the workpiece is heated, the adjacent portions as well as the end may be heated, thus reducing the heating efficiency and resulting in non-uniform heating of the end.

SUMMARY OF THE INVENTION

The present invention provides a method of fabricating a molding which can prevent a boundary line, burrs and level difference at the end of a workpiece to improve the appearance in design, and wherein the end of the workpiece is heated efficiently and uniformly.

There is provided a method of fabricating a molding comprising: an extrusion step of extruding a workpiece; a cutting step of cutting the end of the workpiece so as to form a shape tapered toward the tip thereof; a heating step of heating the end of the workpiece to soften the end of the workpiece; and a molding step of molding the end of the workpiece into a predetermined shape.

As for the method of fabricating a molding according to the present invention, the heating step comprises the steps of: preparing a high frequency heating machine, the machine having an upper electrode and a lower electrode; attaching an auxiliary electrode having a size and a shape corresponding to the end of the workpiece so as to be electrically connected to the upper electrode; placing the workpiece on the lower electrode; and applying high frequency voltage between the auxiliary electrode and the lower electrode.

Further, as for the aforementioned method of fabricating a molding, the high frequency voltage is applied in such a manner that the electric field intensity between the surface of the auxiliary electrode and the surface of the end of the work piece depends on the thickness of the workpiece, so that the auxiliary electrode has a transverse sectional shape which is symmetrical and similar to that of the workpiece.

Furthermore, as for the method of fabricating a molding, the auxiliary electrode has a longitudinal sectional shape which is symmetrical and similar to that of the workpiece.

According to a first aspect of the present invention, in the extrusion step, a long workpiece having a predetermined length and a predetermined general section is extruded; in the cutting step, the backside portion of said workpiece is cut so as to form a shape tapered toward the tip; in the heating step, the end of the workpiece attached to the upper electrode is high-frequency heated between the auxiliary electrode attached to the upper electrode and the lower electrode so as to be softened; and in the molding step, the end of the workpiece, in the softened state, is molded into a predetermined shape.

Then, since the auxiliary electrode having the shape corresponding to the end of the workpiece is attached so as to be electrically connected to the upper electrode, the high frequency heating is not entirely performed between the upper electrode and the lower electrode, but intensively between the auxiliary electrode and the corresponding portion of the lower electrode. Thus, the high frequency wave is concentrated to heat the end of the workpiece more locally and uniformly and hence the heating time may be short. In the molding step, the end of the workpiece can be molded into a predetermined shape surely and smoothly.

According to a second aspect of the present invention, the auxiliary electrode has a transverse sectional shape which is symmetrical and similar to that of the general section of the workpiece. In a transverse sectional direction of the end of the workpiece, therefore, the distance between the surface of the auxiliary electrode and the surface of the end of the workpiece depends on the transverse sectional shape of the workpiece, i.e., short in its thick portion and long in its thin portion. The electric field intensity between the surface of the auxiliary electrode and the surface of the end of the workpiece depends on the thickness of the end of the workpiece, i.e., is high in its thick portion and low in its thin portion. Thus, in the transverse sectional direction of the end of the workpiece, the workpiece can be high-frequency heated in accordance with its thickness so that the local heating of the end of the workpiece can be more effectively carried out. As a result, the heating step and molding step can be implemented effectively.

According to third aspect of the present invention, the auxiliary electrode has the longitudinal sectional shape which is symmetrical and similar to that of the end of the workpiece. In the longitudinal sectional direction of the end of the workpiece, however, the distance between the surface of the auxiliary electrode and the surface of the end of the workpiece depends on the longitudinal sectional shape of the workpiece, i.e., short in its thick portion and long in its thin portion. The electric field intensity between the surface of the auxiliary electrode and the surface of the end of the workpiece depends on the thickness of the end of the workpiece, i.e., is high in its thick portion and low in its thin portion. Thus, also in the longitudinal sectional direction of the end of the workpiece, the workpiece can be high-frequency heated in accordance with its thickness so that the local heating of the end of the workpiece can be carried out more effectively. As a result, in the fabrication of the molding with a long end, the heating step and the molding step can be carried out more effectively.

BRIEF DESCRIPTION OF THE DRAWINGS

FIGS. 8(a) and 8(b) show the end of a molding fabricated by the conventional molding fabrication method.

DETAILED DESCRIPTION OF THE PREFERRED EMBODIMENTS

An explanation will be given of concrete embodiments of the present invention.

1st Embodiment

FIGS. 1(a) to (c) show workpieces to which the method of fabricating or making a molding according to the present invention can be applied. FIG. 1(a) is a transverse sectional view of a workpiece for fabricating a single-layer type molding. FIG. 1(b) is a transverse sectional view of a workpiece for fabricating a double layer type molding having a skin layer on the upper surface and both side surfaces of a core layer. FIG. 1(c) is a transverse sectional view of a workpiece for fabricating a double layer type molding having a skin layer on the entire peripheral surface of a core layer.

First, examples of several workpieces to which the molding fabricating method according to the present invention can be applied are described below. The workpiece 10 shown in FIG. 1(a) is successively extruded into a transverse sectional shape, as shown, by an extrusion machine and cut into predetermined lengths. The synthetic resin material may be polyvinyl chloride (PVC). The synthetic resin is mulled with metallic flakes (e.g., aluminum flakes) as electrically conductive metallic powder (particles). The mulling rate of the metallic powder depends on the output, heating temperature, heating time, etc. of a dielectric heating device (high frequency heating machine) which dielectric-heats the workpiece 1. In such a kind of long workpiece 10, since the synthetic resin material is mixed with conductive metallic powder, the color of the metallic powder appears on an exposed surface (upper surface) which is a design surface 10A.

The workpiece 10 which is relatively long as shown in FIG. 1(b) includes a coating 11 serving as a skin layer and a body 12 serving as a core layer. The coating 11 determines the color or the material characteristic of an exposed surface which is a design surface 10A. The body 12 is mainly made of the synthetic resin material making a good junction with the coating 11. Both the body 12 and coating 11 are preferably made of the same material. Incidentally, even if the body 12 and the coating 11 are made of the materials having different properties, the present invention can be put into practice. The workpiece 10 can be fabricated in such a manner that the synthetic resin material of the body 12 is mulled with electrically conductive powder as in the workpiece in FIG. 1(a), the body 12 is extruded individually and the coating 11 is also integrally extruded on the upper surface of the body 12 by two layered co-extrusion so as to form the transverse sectional to be cut into a predetermined length. The mulling rate of the metallic powder in the body 12 is determined considering the condition such as thermal conductivity between the coating 11 and the body 12 in addition to the same condition as that for the workpiece 10 as shown in FIG. 1(a). Such a kind of workpiece 10 reveals the color and characteristic of the coating 11 on the design surface.

Figure 1:
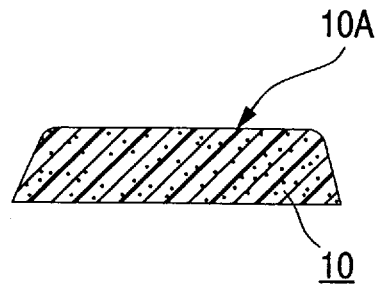
FIGS. 1(a) to 1(c) show a workpiece to which the method of fabricating a molding according to the present invention can be applied.
Figure 1:
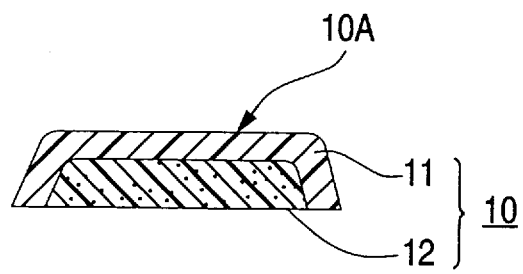
Figure 1:
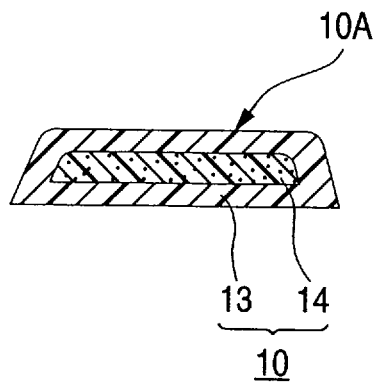

Likewise, the workpiece 10 which is relatively long as shown in FIG. 1(c) includes a coating 13 serving as a skin layer and a body 14 serving as a core layer. The coating 13 determines the color or the material characteristic of an exposed surface which is a design surface 10A. The body 14 is mainly made of the synthetic resin material making a good junction with the coating 13. Both the body 14 and coating 13 are preferably made of the same material. The workpiece 10 can be fabricated in such a manner that the synthetic resin material of the body 14 is mulled with electrically conductive powder as in the workpiece in FIG. 1(a), the body 14 is extruded individually and the coating 13 is also integrally extruded on the entire periphery of the body 14 by the two layered co-extrusion so as to form the transverse sectional shape to be cut into a predetermined length. The mulling rate of the metallic powder in the body 14 is determined considering the same condition as that for the workpiece 10 as shown in FIG. 1(b). Such a kind of workpiece 10 (FIG. 1 (c)) reveals the color and characteristic of the coating 13 on the design surface.

With reference to the workpiece of FIG. 1(b), an explanation will be given of the molding according to one embodiment of the present invention.

Figure 2:
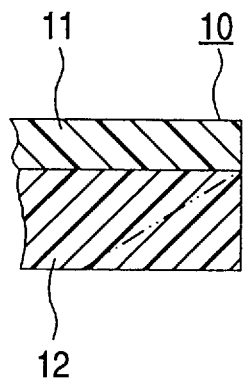
FIGS. 2(a) to 2(c) show the end of a workpiece for making the short end molding according to a method of fabricating a molding according to a first embodiment of the present invention.
Figure 2:
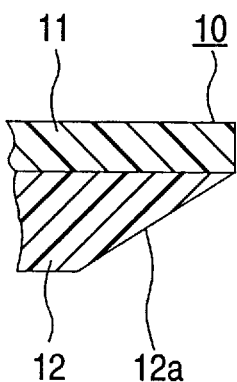
Figure 2:
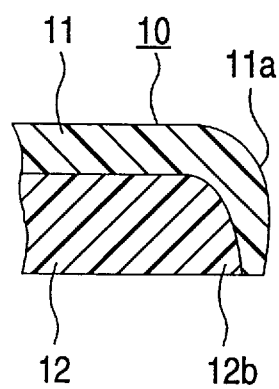

FIGS. 2(a) to 2(c) show the end of a workpiece for making a molding with a short end according to the method of fabricating a molding according to one embodiment of the present invention. FIG. 2(a) illustrates the end of the workpiece before a cutting step. FIG. 2(b) illustrates the end of the workpiece after the cutting step. FIG. 2(c) illustrates the end of the workpiece after a molding or forming step, in their longitudinal sections, respectively.

In FIGS. 2(a) to 2(c), the workpiece 10 is for making a molding with a short end. Such a workpiece 10 is manufactured in such a manner that the long workpiece 10 having a general section as shown in FIG. 1(b) is extruded in an extrusion step from the known extrusion machine, cooled/solidified and cut into a predetermined length, resulting in the longitudinal section as shown in FIG. 2(a). In a cutting step, the back side (body 12) at the end of the workpiece 10 is cut along a two-dot chain line in FIG. 2(a) so as to form a shape tapered toward the tip (right side of the figure), more specifically a triangular sectional shape, resulting in an end having a cut section 12a. Now it is assumed that the angle of a cut tip at the end of the workpiece 10 is determined by the forming conditions such as the format, heating temperature and viscosity when the end is formed. After the end of the workpiece 10 is softened by heating in the heating step, the end of the workpiece, in the softened state, is molded in the molding step, resulting in a longitudinal sectional shape which is a final product shape.

Figure 3:
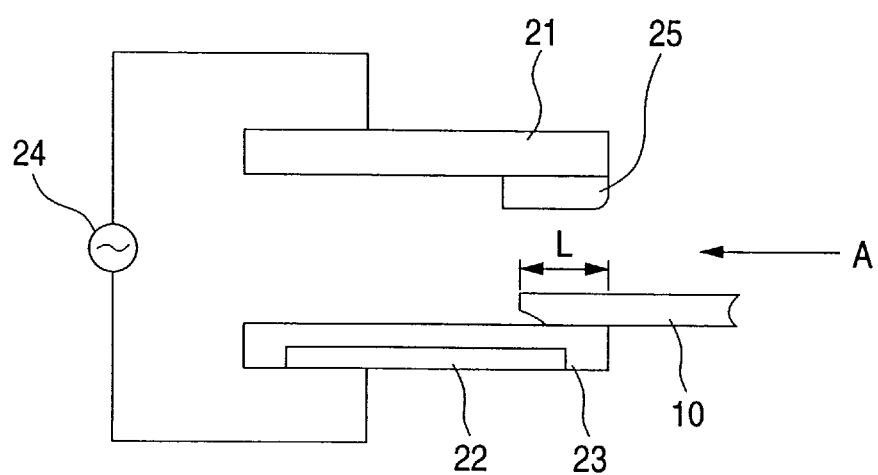
FIG. 3 is a schematic illustration of the high frequency used in the molding fabricating method according to the first embodiment of the present invention.
Figure 4:
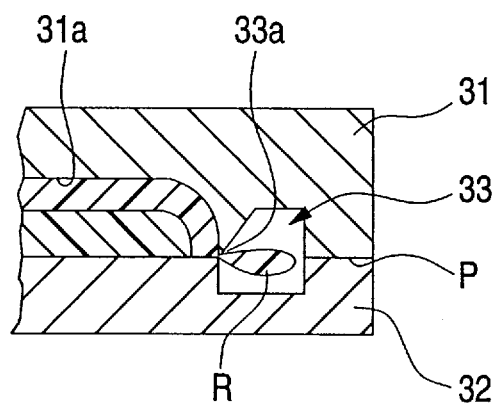
FIG. 4 is a sectional view showing the main part of a die used in the molding fabricating method according to the first embodiment of the present invention.

Concretely, the above heating step is effected using a high frequency heating machine as shown in FIG. 3, and the molding step is implemented using a die or a couple of stamping molds as shown in FIG. 4. FIG. 3 is a schematic view of the high frequency heating machine used in the molding fabricating method according to one embodiment of the present invention. FIG. 4 is a sectional view showing the main part of the die used in the molding fabricating method according to one embodiment of the present invention.

First, an explanation will be given of the high frequency heating machine used in the heating step. The high frequency heating machine, as shown in FIG. 3, includes an upper electrode 21 and a lower electrode 22 serving as body electrodes which are arranged oppositely to each other with a predetermined gap therebetween, a polytetrafluoroethylene plate 23 covering the entire upper surface of the lower electrode 22, and a high frequency oscillator 24 for applying a high frequency voltage between the upper electrode and lower electrode. Such a configuration itself is known. The high frequency heating machine according to this embodiment is characterized in that the an auxiliary electrode 25 having various shapes is attached to the upper electrode 21 in accordance with the shape of the end of the workpiece to be manufactured. Incidentally, the high frequency oscillator 24 in this embodiment has high frequency power of 2 KW at the frequency of 62 MHz.

In order to implement the heating step using the high frequency heating machine having such a configuration, first, an auxiliary electrode having a size and shape corresponding to those of the end of the workpiece is attached so as to be electrically connected to the upper electrode 21. The end of the workpiece 10 is placed on the lower electrode 22 through the plate 23. The high frequency oscillator 24 applies a high frequency voltage between the upper electrode 21 and the lower electrode 22. The high frequency voltage from the high frequency oscillator 24 is not applied entirely between the upper electrode 21 and lower electrode 22, but is intensively applied between the upper electrode 21 and the auxiliary electrode 25 so that the end of the workpiece 10 is high-frequency-heated (inductive heating). Thus, the predetermined area L at the end of the workpiece 10 is softened and in a remoldable state. Then, the body 12 of the workpiece 10 is mulled with metallic powder such as metal flakes so that molecular excitation is activated to promote heating for the end of the workpiece 10.

In heating the workpiece 10, the length of the auxiliary electrode 25 and the range of placing/supporting the end area inclusive the end of the workpiece 10 on the lower electrode 22 are preferably so set that the end area inclusive of the tip of workpiece 10 can be heated to the body area plus about 10 to 15 mm from the terminal (left end of the cut portion in FIG. 2) of the cut portion of the end. This is because heating only the cut portion of the end leads to the restoration of form by spring-back in the molding step which may result in poor products. From the point of view of uniform heating of the workpiece 10 and others, the heating step is preferably carried out under the conditions of the distance between the electrodes (in this embodiment, the distance between the auxiliary electrode 25 and lower electrode 22) of about 20 mm, heating time of 10 sec and heating temperature of about 150° C.

An explanation will be given of the molding step. As shown in FIG. 4, the die used in the molding step comprises an upper die 31a having a molding space 31 corresponding to the design surface (upper surface and right and left sides) of the end of the workpiece 10 and a lower die 32 tightened by the upper die 31a and a parting line P. At the tip side of the workpiece 10 in the upper die 31 and lower die 32, a removal space 33 for removing automatically redundant resin R such as burrs of the tip of the workpiece 10 through its escape is formed adjacently to the molding space 31a. A cutting blade 33a is formed between the upper die 31 and the lower die 32 in the removal space 33. In tightening, using the cutting blade 33a, the redundant resin R at the tip of the workpiece 10 is cut.

The end of the workpiece 10 softened by the heating step is molded in a predetermined shape using the die as follows. First, the workpiece 10 of FIG. 2(b) whose portion in a predetermined range is softened in a remoldable state is placed at a predetermined position on the lower die 32 and the upper die 31 and lower die 32 are tightened. Then, the end of the workpiece 10 is formed into a shape of FIG. 2(c), and the tip of the body 12 is plastically deformed downwardly, thus forming a body end 12b of the molding. The coating 11 is plastically deformed so as to coat the body 12, thus forming an end coating 11a (FIG. 2 (c)) of the molding. The end coating 11a covers the entire body end 12b so as to constitute the design of the end of the molding. The redundant resin R such as a burr made of redundant resin material on the tip side of the workpiece 10 are cut by the cutting blade 33a and removed in the removal space 33. The burrs at the tip of the workpiece 10 is automatically removed, thus preventing product failure such as burrs in a final product.

2nd Embodiment

An explanation will be given of a method of fabricating a molding according to the second embodiment of the present invention.

Figure 5:
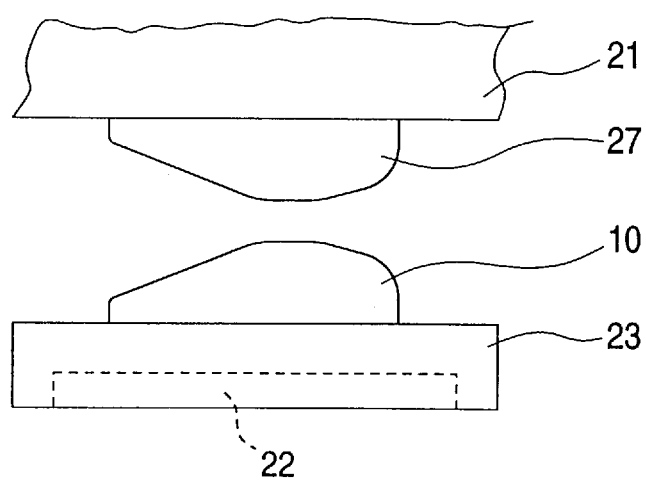
FIG. 5 is a schematic view showing an auxiliary electrode of the high frequency heating machine used in the method of fabricating a molding according to a second embodiment of the present invention.

FIG. 5 is a schematic view showing an auxiliary electrode of a high frequency heating machine used in the method of fabricating a molding according to the second embodiment of the present invention.

In this embodiment, the transverse sectional shape of the auxiliary electrode 27, is made symmetrical and similar to that of the general section of the workpiece 10. The high frequency heating machine in FIG. 5 in which an auxiliary electrode 27 is substituted for the auxiliary electrode 25 of the high frequency heating machine in FIG. 3 is viewed in direction A in FIG. 3. The remaining structure is the same as that of FIG. 3 and the detail thereof is not explained here.

In this embodiment, the auxiliary electrode 27 has the transverse sectional shape which is symmetrical and similar to that of the general section of the workpiece 10. In a transverse sectional direction at the end of the workpiece 10, therefore, the distance between the surface of the auxiliary electrode 27 and that of the end of the workpiece 10 depends on the transverse sectional shape of the workpiece 10, i.e., short in its thick portion and long in its thin portion. The electric field intensity between the surface of the auxiliary electrode 27 and that of the end of the workpiece 10 depends on the thickness of the end of the workpiece 10, i.e., is high in its thick portion and low in its thin portion. Thus, in the transverse sectional direction of the end of the workpiece 10, the workpiece 10 can be high-frequency heated in accordance with its thickness so that the local heating of the end of the workpiece 10 can be more effectively carried out.

3rd Embodiment

An explanation will be given of a method of fabricating a molding according to the third embodiment of the present invention in connection with the workpiece as shown in FIG. 1(b).

Figure 6:
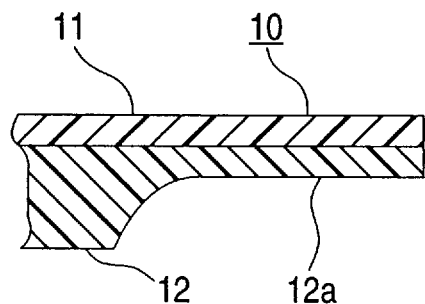
FIGS. 6(a) and 6(b) show the end of the workpiece for making a molding with a long end according to the method of fabricating the molding according to a third embodiment of the present invention.
Figure 6:
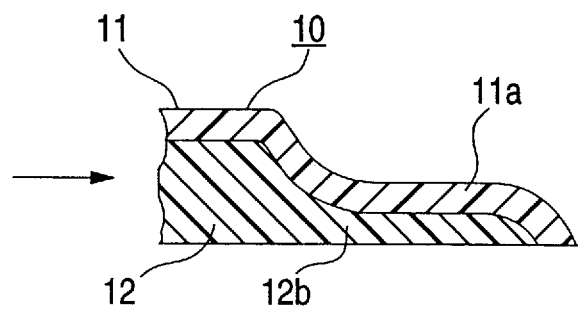

FIG. 6(a) shows the end of a workpiece for making a molding with an long end according to the method of fabricating the molding according to the third embodiment of the present invention. FIGS. 6(a) and 6(b) are longitudinal sectional views illustrating the end of the workpiece after the cutting step and after the molding step, respectively.

This embodiment intends to fabricate a molding with a long end. In FIG. 6(a), such a workpiece 10 is manufactured in such a manner that the long workpiece having a general section as shown in FIG. 1(b) is extruded in an extrusion step from the known extrusion machine, cooled/solidified and cut into a predetermined length, resulting in the same longitudinal section as that of the workpiece for making a short end molding as shown in FIG. 2(a). In a cutting step, the back side (body 12) at the end of the workpiece 10 is cut so as to form a shape tapered toward the tip (right side of the figure), more specifically a plate-like shape on the right side of the figure and a downward-bending shape on the left side, resulting in an end having a cut section 12a as shown in FIG. 6(a).

In the heating step, with the auxiliary electrode replaced by that having the size and shape corresponding to the end of the workpiece 10, the end of the workpiece 10 is heated and softened by the high frequency heating machine shown in FIG. 3. Thereafter, the end of the workpiece 10 in the softened state is molded in a molding step, resulting in a couple of stamping molds (not shown) having a molding space corresponding to a final product shape of the end. Such a stamping mold is different from the stamping mold of FIG. 4 in only the shape of the molding space, and identical in that there is a removal space and the redundant resin is automatically removed. Thus, the end of the workpiece 10 is molded into a shape of FIG. 6(b), and the tip of the body 12 is plastically deformed downwardly, thus forming a body end 12b of the molding. The coating 11 is plastically deformed so as to coat the body 12, thus forming an end coating 11a of the molding. The end coating 11a coats the entire body end 12b so as to constitute the design of the end of the molding. The details of the heating step and molding step, which are similar to that in the first embodiment, are not explained.

Figure 7:
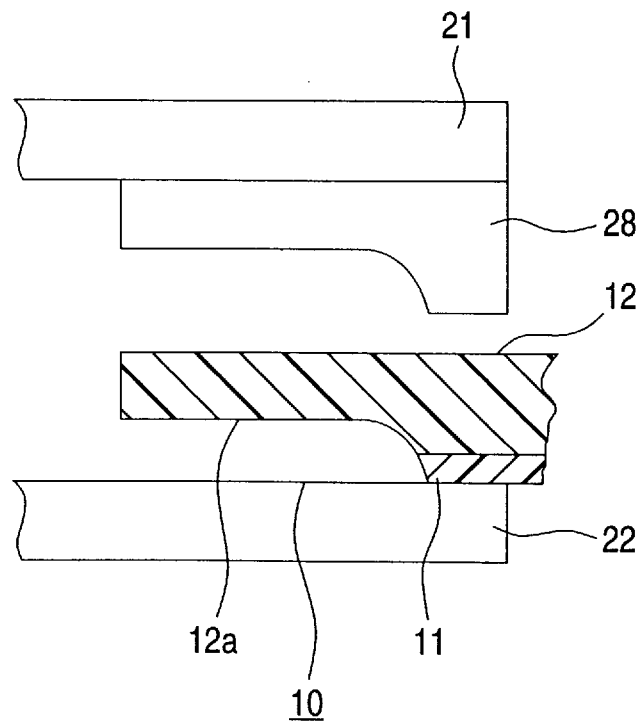
FIG. 7 is a side view showing an auxiliary electrode of the high frequency heating machine used in the method of fabricating a molding according to the third embodiment of the present invention.

This embodiment is for making a molding with a long end. In order to enhance the heating efficiency in the longitudinal sectional direction of the end, as shown in FIG. 7, the auxiliary electrode 28 in the high frequency heating machine preferably has a transverse sectional shape which is symmetrical and similar to the general section of the workpiece 10 and has also a longitudinal sectional shape which is symmetrical and similar to the longitudinal sectional shape of the end of the workpiece 10.

Thus, in addition to operation and effect of the first and second embodiment, also in the longitudinal sectional direction at the end of the workpiece 10, the distance between the surface of the auxiliary electrode 28 and that of the end of the workpiece 10 depends on the transverse sectional shape of the workpiece 10, i.e., short in its thick portion and long in its thin portion. The electric field intensity between the surface of the auxiliary electrode 28 and that of the end of the workpiece 10 depends on the thickness of the end of the workpiece 10, i.e., is high in its thick portion and low in its thin portion. Thus, also in the longitudinal sectional direction of the end of the workpiece 10, the workpiece 10 can be high-frequency heated in accordance with its thickness so that local heating of the end of the workpiece 10 can be more effectively carried out.

In this way, a method of fabricating a molding according to each of the embodiments includes an extrusion step of extruding a long size workpiece 10 having a predetermined length and a predetermined general section, a cutting step of cutting the backside of the workpiece so as to form a shape tapered toward the tip; a heating step of attaching an auxiliary electrode 25, 27, 28 having a shape corresponding to that of the end of the workpiece 10 so as to be electrically connected to the upper electrode 21 of the high frequency heating machine having the upper electrode 21 and lower electrode 22, placing/supporting the workpiece 10 on the lower electrode 22 through the plate 23 and high-frequency heating the end of the workpiece 10 between the auxiliary electrode 25 and the lower electrode 22; and a molding step of molding the end of the workpiece 10 into a predetermined shape between the upper die 31 and lower die 32 and automatically removing the redundant resin R in the removal space 33.

Therefore, in each of the embodiments, in the extrusion step, a long workpiece 10 having a predetermined length and a predetermined general section is extruded; in a cutting step, the backside of the workpiece is cut so as to form a shape tapered toward the tip; in the heating step, the end of the workpiece 10 is high-frequency heated between the auxiliary electrode attached to the upper electrode 21 and the lower electrode 22 so as to be softened; and in the molding step, the end of the workpiece 10, in the softened state, is molded into a predetermined shape.

In the first embodiment, the auxiliary electrode 25 having the shape corresponding to the end of the workpiece 10 is attached so as to be electrically connected to the upper electrode 21; the high frequency heating is not entirely performed between the upper electrode 21 and the lower electrode 22, but intensively between the auxiliary electrode 25 and the corresponding portion of the lower electrode 21. Thus, the high frequency wave is concentrated to heat the end of the workpiece 10 more locally and uniformly and hence the heating time may be short. In the molding step, the end of the workpiece 10 can be molded into a predetermined shape surely and smoothly.

As a result, the boundary line, burr, level difference, etc. at the end of the workpiece 10 can be prevented so as to improve the appearance of the design of the molding as a final product. Further, the end of the workpiece 10 can be heated effectively and uniformly to improve the design of the molding as a final product.

In the second embodiment, the auxiliary electrode 27 has a transverse sectional shape which is symmetrical and similar to that of the general section of the workpiece 10. In a transverse sectional direction of the end of the workpiece 10, therefore, the distance between the surface of the auxiliary electrode 27 and that of the end of the workpiece 10 depends on the transverse sectional shape of the workpiece 10, i.e., short in its thick portion and long in its thin portion. The electric field intensity between the surface of the auxiliary electrode 27 and that of the end of the workpiece 10 depends on the thickness of the end of the workpiece 10, i.e., is high in its thick portion and low in its thin portion. Thus, in the transverse sectional direction of the end of the workpiece 10, the workpiece 10 can be high-frequency heated in accordance with its thickness so that the local heating of the end of the workpiece 10 can be more effectively carried out. As a result, the heating step and molding step can be implemented effectively.

Further, in the third embodiment, the auxiliary electrode 28 has a transverse sectional shape which is symmetrical and similar to that of the general section of the workpiece 10, and has also a longitudinal sectional shape which is symmetrical and similar to that of the end of the workpiece 10. Thus, in addition to operation and effect of the first and second embodiment, also in the longitudinal sectional direction of the end of the workpiece 10, the distance between the surface of the auxiliary electrode 28 and that of the end of the workpiece 10 depends on the longitudinal sectional shape of the workpiece 10, i.e., short in its thick portion and long in its thin portion. The electric field intensity between the surface of the auxiliary electrode 25 and that of the end of the workpiece 10 depends on the thickness of the end of the workpiece 10, i.e., is high in its thick portion and low in its thin portion. Thus, also in the longitudinal sectional direction of the end of the workpiece be high-frequency 10 can be high-frequency heated in accordance with its thickness so that the local heating of the end of the workpiece 10 can be carried out more effectively. As a result, in the fabrication of the molding with a long end, the heating step and the molding step can be carried out more effectively.

The body 12 of the workpiece 10 is mulled with electrically conductive metallic powder such as metal flakes so that in the high frequency heating (dielectric heating), the dielectric loss of the workpiece 10 is increased to improve the heating efficiency, thus permitting the end of the workpiece to be easily molded. Incidentally, in the present invention, the material of the workpiece 10 is not required to be entirely mixed with conductive powder, but may be partially mixed with the conductive powder. The conductive powder is not limited to the metallic powder as long as it is powder with large dielectric loss. The powder may have such a grain size that the powder can be mixed with the material of the workpiece. Additionally, in the present invention, the workpiece 10 is heated by the high frequency heating (dielectric heating) so that the workpiece 10 is not required to be internally mulled with electrically conductive powder as long as it is made of the dielectric material (insulating material) such as PVC permitting molecular excitation.

While the invention has been describe in connection with what is presently considered to be the most practical and preferred embodiment, it is understood that the invention is not limited to the disclosed embodiments but, on the contrary, is intended to cover various modifications and equivalent arrangements included within the spirit and scope of the appended claims.

What is claimed is:

1. A method of fabricating a molding comprising the steps of:

extruding a workpiece;

cutting a portion of an end of the workpiece so as to form a shape tapered toward a tip thereof;

preparing a high frequency heating machine, the machine having an upper electrode and a lower electrode in opposing relation;

attaching an auxiliary electrode having a size and a shape corresponding to the end of the workpiece so as to be electrically connected to one of the upper and lower electrodes;

placing the workpiece on the other electrode disposed opposite to the auxiliary electrode;

applying high frequency voltage between the auxiliary electrode and the other electrode to heat and soften the end of the workpiece; and molding the end of the workpiece into a predetermined shape.

2. The method according to claim 1, wherein the auxiliary electrode is attached to the upper electrode and the workpiece is placed on the lower electrode.

3. The method of fabricating a molding according to claim 1, wherein the high frequency voltage is applied in such a manner that the electric field intensity between a surface of the auxiliary electrode and a surface of the end of the workpiece depends on the thickness of the workpiece, the auxiliary electrode having a transverse sectional shape which is symmetrical and similar to that of the workpiece.

4. The method of fabricating a molding according to claim 3, wherein the auxiliary electrode has a longitudinal sectional shape which is symmetrical and similar to that of the workpiece.

5. The method of fabricating a molding according to claim 1, further comprising the steps of mulling the workpiece with metallic flakes.

6. The method of fabricating a molding according to claim 1, wherein the cut portion of the end and a portion adjacent to the cut portion of the workpiece are heated by the high frequency voltage.

7. A method of fabricating a molding comprising the steps of:

extruding a workpiece;

cutting a portion of an end of the workpiece so as to form a predetermined shape;

placing the end of the workpiece into a high frequency heating machine, said high frequency heating machine having an auxiliary electrode and an opposed electrode, the size and shape of said auxiliary electrode corresponding to the size and shape of the end of the workpiece;

applying high frequency voltage to heat and soften the end of the workpiece in such a manner that an electric field intensity applied on a surface of the end of the workpiece is in proportion to a thickness of the workpiece; and molding the end of the workpiece.

8. A method of fabricating a molding according to claim 7, wherein the electric field intensity is in proportion to the transverse thickness of the end of the workpiece.

9. The method of fabricating a molding according to claim 8, wherein the electric field intensity is in proportion to the longitudinal thickness of the end of the workpiece.

10. The method of fabricating a molding according to claim 7, further comprising the steps of mulling the workpiece with metallic flakes.

11. The method of fabricating a molding according to claim 7, wherein the cut portion of the end and a portion adjacent to the cut portion of the workpiece are heated by the high frequency voltage.

* * * * *